United States Patent
Hsu

(10) Patent No.: US 8,253,280 B2
(45) Date of Patent: Aug. 28, 2012

(54) VOICE COIL MOTOR

(75) Inventor: Mao-Kuo Hsu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 299 days.

(21) Appl. No.: 12/791,882

(22) Filed: Jun. 2, 2010

(65) Prior Publication Data

US 2011/0241450 A1    Oct. 6, 2011

(30) Foreign Application Priority Data

Apr. 6, 2010    (TW) ................................ 99110653 A

(51) Int. Cl.
*H02K 41/035*    (2006.01)
(52) U.S. Cl. ................... 310/12.16; 310/12.33; 310/410
(58) Field of Classification Search ............... 310/12.16, 310/12.33, 89, 402, 405, 410, 418
See application file for complete search history.

(56) References Cited

U.S. PATENT DOCUMENTS

| | | | | |
|---|---|---|---|---|
| 3,299,304 A | * | 1/1967 | Hull | ........ 310/216.127 |
| 3,482,125 A | * | 12/1969 | Fleckenstein | ........ 310/51 |
| 2008/0036304 A1 | * | 2/2008 | Ho et al. | ........ 310/12 |
| 2008/0284255 A1 | * | 11/2008 | Liu et al. | ........ 310/12 |
| 2010/0133923 A1 | * | 6/2010 | Liao et al. | ........ 310/12.02 |
| 2010/0270870 A1 | * | 10/2010 | Liao | ........ 310/12.16 |
| 2011/0031822 A1 | * | 2/2011 | Chou | ........ 310/12.16 |
| 2011/0249352 A1 | * | 10/2011 | Ku et al. | ........ 359/824 |
| 2012/0091827 A1 | * | 4/2012 | Chiang | ........ 310/12.16 |

* cited by examiner

*Primary Examiner* — Dang Le
(74) *Attorney, Agent, or Firm* — Altis Law Group, Inc.

(57) ABSTRACT

A voice coil motor includes a stationary frame defining a first receiving space, a cover, and a base defining a second receiving space. The stationary frame includes a top surface and an opposite bottom surface. The top surface defines at least two first recesses. A first blocking portion is formed between each first recess and the first receiving space. At least two first protruding portions extend from the bottom surface. The cover is mounted to the top surface and includes a first surface facing the top surface. At least two second protruding portions extend from the first surface corresponding to the first recesses. The base supports the bottom surface and includes a second surface facing the bottom surface. The second surface defines at least two second recesses corresponding to the first protruding portions. A second blocking portion is formed between each second recess and the second receiving space.

9 Claims, 3 Drawing Sheets

VOICE COIL MOTOR

BACKGROUND

1. Technical Field

The present disclosure relates to lens actuators and, particularly, to a voice coil motor for driving lenses in a lens module.

2. Description of Related Art

Currently, a voice coil motor is preferred for driving lenses in image capturing devices to achieve an auto-focus function of the image capturing device. Generally, the voice coil motor includes a stationary frame, a moveable frame spatially received in the stationary frame, a first elastic plate, a cover, a second elastic plate, and a base. The cover and the first elastic plate are mounted to a top surface of the stationary frame. The first elastic plate is positioned between the cover and the top surface. The base and the second elastic plate are mounted to a bottom surface of the stationary frame. The second elastic plate is positioned between the bottom surface and the base. The moveable frame is configured for receiving the lenses and being driven by the stationary frame to move.

In assembly, after the first elastic plate is fixed to the top surface of the stationary frame, glue is dropped between the cover and the top surface to affix the cover and the stationary frame. After the second elastic plate is fixed to the bottom surface of the stationary frame, glue is dropped between the bottom surface and the base to affix the stationary frame to the base. However, the glue easily overflows to the moveable frame, which may cause the moveable frame to adhere to the stationary frame. When this happens, the moveable frame cannot move.

Therefore, it is desirable to provide a voice coil motor, which can overcome or at least alleviate the above-mentioned problems.

DETAILED DESCRIPTION

Figure 1:
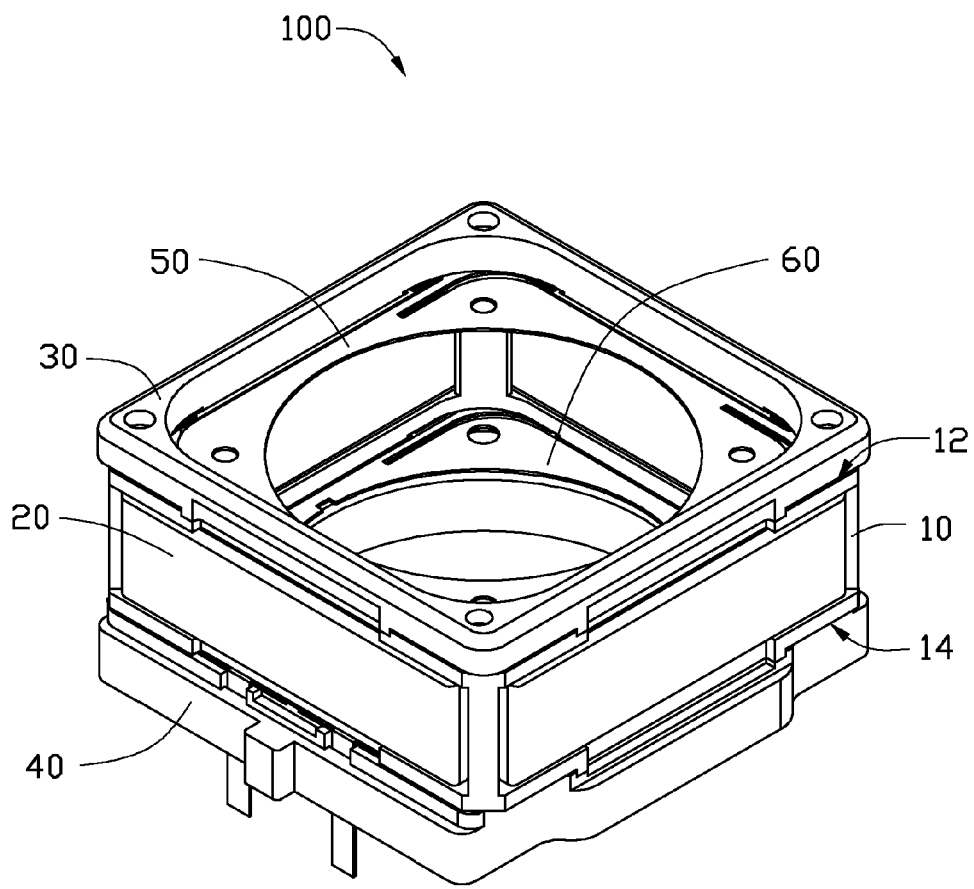
FIG. 1 is a schematic, isometric view of a voice coil motor, according to an exemplary embodiment.

Referring to FIG. 1, a voice coil motor 100, according to an exemplary embodiment, is shown. The voice coil motor 100 is used in image capturing devices, such as cameras, mobile phones, or digital videos, to drive lenses received therein.

The voice coil motor 100 includes a stationary frame 10, a magnetic assembly 20, a cover 30, a base 40, a first elastic plate 50, a second elastic plate 60, and a moveable frame (not shown). The stationary frame 10 has a top surface 12 and a bottom surface 14. The top surface 12 and the bottom surface 14 are positioned at opposite sides of the stationary frame 10. The cover 30 is mounted to the top surface 12. The bottom surface 14 is supported by the base 40.

Figure 2:
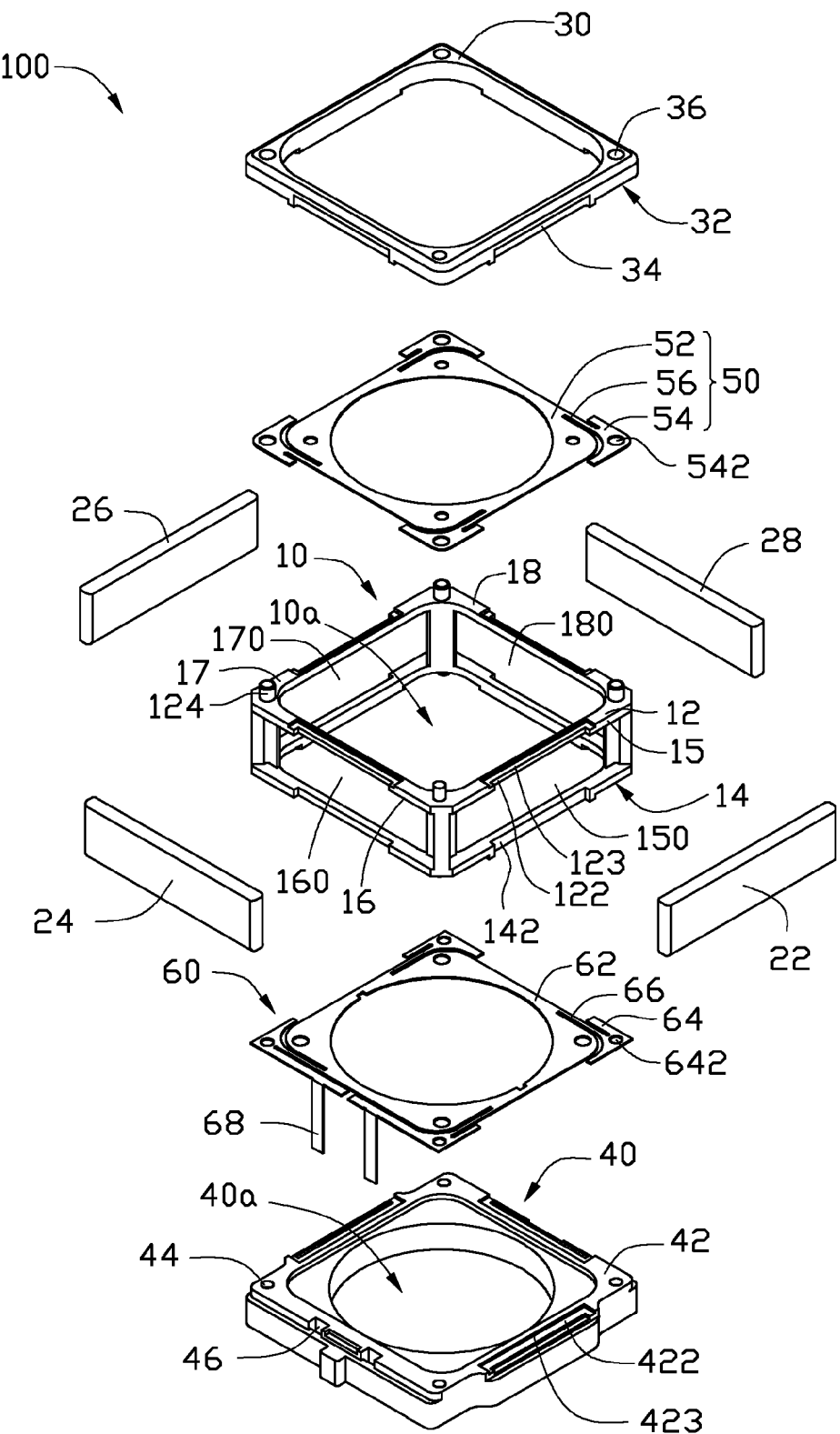
FIG. 2 is an exploded view of the voice coil motor of FIG. 1.
Figure 3:
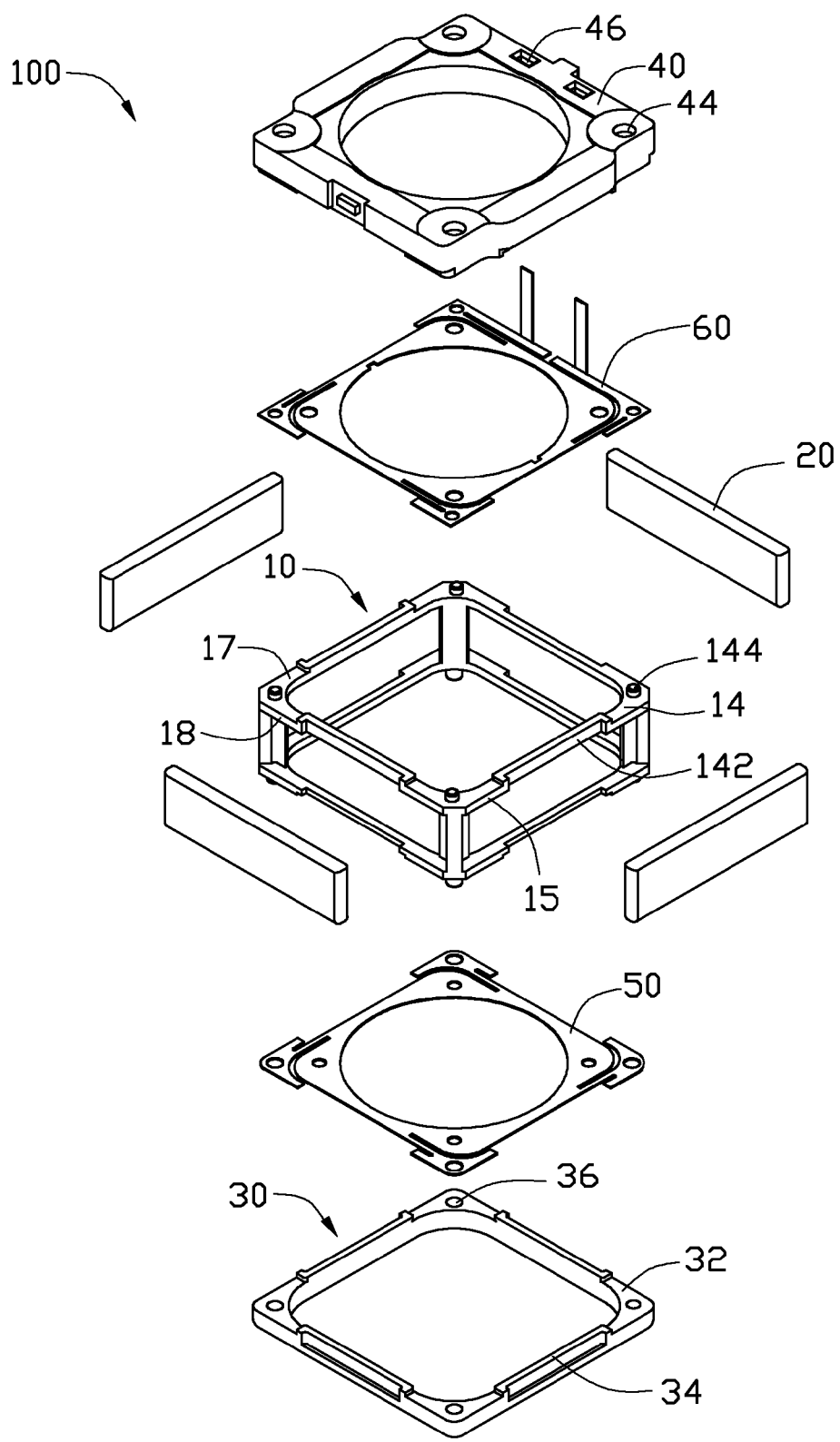
FIG. 3 is similar to FIG. 2, but viewed from another aspect.

Referring to FIG. 2 together with FIG. 3, the stationary frame 10 is substantially cuboid and includes a first sidewall 15, a second sidewall 16, a third sidewall 17, and a fourth sidewall 18. The four sidewalls 15, 16, 17, and 18 are connected to each other end-to-end correspondingly and cooperatively define a first receiving space 10a. Each sidewall defines a receiving hole. In particular, the first sidewall 15 defines a first receiving hole 150. The second sidewall 16 defines a second receiving hole 160. The third sidewall 17 defines a third receiving hole 170. The fourth sidewall 18 defines a fourth receiving hole 180. The four receiving holes 150, 160, 170, and 180 are in communication with the first receiving space 10a.

The top surface 12 defines four first recesses 122 at four top sides of the four sidewalls 15, 16, 17, and 18 respectively. A first blocking portion 123 is formed on the top surface 12 between each first recess 122 and the first receiving space 10a. In other words, the first blocking portion 123 serves as a sidewall of the first recess 122. Four locating posts 124 extend from four corners of the top surface 12. In this embodiment, each first recess 122 is a cutout in the middle of the top side of each sidewall. A side of each first recess 122 away from the first receiving space 10a is open. In other words, the cutouts opens toward directions away from the first receiving space 10a.

Three first protruding portions 142 and four positioning posts 144 extend from the bottom surface 14. The three first protruding portions 142 are positioned on the bottom sides of the first sidewall 15, the third sidewall 17, and the fourth sidewall 18, respectively. In this embodiment, each protruding portion 142 is positioned in the middle of the bottom side of the three sidewalls 15, 17, and 18. The four positioning posts 144 extend from four corners of the bottom surface 14.

The magnetic assembly 20 includes a first magnet 22, a second magnet 24, a third magnet 26, and a fourth magnet 28. The first magnet 22 is received in the first receiving hole 150. The second magnet 24 is received in the second receiving hole 160. The third magnet 26 is received in the third receiving hole 170. The fourth magnet 28 is received in the fourth receiving hole 180.

The cover 30 is substantially a cuboid frame conforming to the stationary frame 10. The cover 30 includes a first surface 32 and four second protruding portions 34. The first surface 32 faces the top surface 12. The four second protruding portions 34 extend from the first surface 32 corresponding to the four first recesses 122. The cover 30 defines four first through holes 36 corresponding to the four locating posts 124.

The base 40 is substantially a cuboid frame conforming to the stationary frame 10 and defines a second receiving space 40a align with the first receiving space 10a. The base 40 is coaxial with the stationary frame 10. The base 40 includes a second surface 42 facing the bottom surface 14. The second surface 42 defines three second recesses 422, four second through holes 44, and two guiding holes 46. The three second recesses 422 correspond to the three first protruding portions 142, respectively. A second blocking portion 423 is formed on the second surface 42 between each second recess 422 and the second receiving space 40a. In other words, the second blocking portion 423 serves as a sidewall of each second recess 422. The four second through holes 44 correspond to the four positioning posts 144, respectively. The two guiding holes 46 correspond to the second sidewall 16. In this embodiment, each second recess 422 is a cutout. A side of the second recess 422 away from the second receiving space 40a is open. In other words, the cutout opens toward away from the second receiving space 40a.

The moveable frame (not shown) is surrounded by coils (not shown) and is configured for receiving lenses. The moveable frame is received in the first receiving space 10a and spaced from the stationary frame 10. The coils face the magnetic assembly 20.

The first elastic plate 50 includes a first moveable portion 52, four first stationary portions 54, and four first deformed portions 56. The shape of the first moveable portion 52 is substantially the same as that of an upper surface of the moveable frame. The first moveable portion 52 is fixedly attached to the upper surface of the moveable frame and moves together with the moveable frame. The first stationary portions 54 are fixed on the top surface 12. Each first stationary portion 54 defines a third through hole 542 corresponding to the locating post 124. The four first deformed portions 56 connect the first movable portion 52 to the four first stationary portions 54, respectively. The four first deformed portions 56 are suspended between the stationary frame 10 and the moveable frame and deform in the space.

The second elastic plate 60 is similar to the first elastic plate 50. The second elastic plate 60 includes a second moveable portion 62, four second stationary portions 64, four second deformed portions 66, and two connectors 68. The shape of the second moveable portion 62 is substantially the same as that of a lower surface of the moveable frame. The second moveable portion 62 is fixedly attached to the lower surface and move together with the moveable frame. The second stationary portions 64 are fixed on the bottom surface 14. Each second stationary portion 64 defines a fourth through hole 642 corresponding to the positioning post 144. The four second deformed portions 66 connect the second moveable portion 62 to the four second stationary portions 64, respectively. The four second deformed portions 66 are suspended between the stationary frame 10 and the moveable frame and deform in the space. The connectors 68 pass through the guiding holes 46 to connect other electronic devices (not shown) outside the voice coil motor 100.

In assembly, the moveable frame is received in the first receiving space 10a. The first moveable portion 52 is fixedly attached to the upper surface of the moveable frame. The locating posts 124 engage with the third through holes 542 so that the first elastic plate 40 is fixed on the top surface 12 and the moveable frame. The second moveable portion 62 is fixedly attached to the lower surface of the moveable frame. The positioning posts 144 engage with the fourth through holes 642 so that the second elastic plate 60 is fixed on the bottom surface 14 and the moveable frame. The locating posts 124 engage with the first through holes 36. The second protruding portions 34 are received in the first recesses 122. Glue is dropped between the second protruding portions 34 and the first recesses 122 so that the cover 30 is fixedly attached on the top surface 12. The positioning posts 144 engage with the second through holes 44. The first protruding portions 142 are received in the second recesses 422. Glue is dropped between the first protruding portions 142 and the second recesses 422 so that the stationary frame 10 is fixedly attached on the second surface 32 of the base 30. Meanwhile, the connectors 68 pass through the guiding holes 46 to connect other electronic devices outside the voice coil motor 100.

In this embodiment, the glue may be entirely received in the first recesses 122 and the second recesses 422 so that the glue does not overflow to the moveable frame to influence the moveable frame. Even if the glue were to overflow, the first blocking portions 123 and the second blocking portions 423 would block the glue from overflowing to the moveable frame. Therefore, the moveable frame cannot be influenced by the glue and can move to focus the lenses.

In other embodiments, the first recesses 122 and the second recesses 422 are not cutouts but are closed grooves. In other words, each first recess 122 and each second recess 422 are bounded by four sidewalls. Therefore, the first recesses 122 and the second recesses 422 can provide space for receiving extra glue. In this way, the extra glue cannot overflow to the moveable frame to influence the moveable frame. Therefore, the moveable frame cannot be influenced by the glue and can move to focus the lenses.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A voice coil motor, comprising:
   a stationary frame defining a first receiving space, the stationary frame comprising a top surface and a bottom surface at two opposite sides of the stationary frame, the top surface defining at least two first recesses, a first blocking portion formed between each first recess and the first receiving space, at least two first protruding portions extending from the bottom surface;
   a cover mounted to the top surface, the cover comprising a first surface facing the top surface, at least two second protruding portions extending from the first surface spatially corresponding to the first recesses, each second protruding portion attached in the corresponding first recess by adhesive; and
   a base defining a second receiving space aligned with the first receiving space, the bottom surface supported by the base, the base comprising a second surface facing the bottom surface, the second surface defining at least two second recesses spatially corresponding to the first protruding portions, a second blocking portion formed between each second recess and the second receiving space, each first protruding portion attached in the corresponding second recess by adhesive.

2. The voice coil motor as claimed in claim 1, wherein the first recesses are cutouts opening toward directions away from the first receiving space, and the second recesses are cutouts opening toward directions away from the second receiving space.

3. The voice coil motor as claimed in claim 2, wherein the stationary frame is substantially cuboid and comprises a first sidewall, a second sidewall, a third sidewall, and a fourth sidewall, the four sidewalls cooperatively define the first receiving space, each sidewall defines a receiving hole communicating with the first receiving space.

4. The voice coil motor as claimed in claim 3, further comprising a magnetic assembly, a coil and a moveable frame surrounded by the coil, wherein the magnetic assembly comprises four magnets, each magnet is received in a corresponding receiving hole, the moveable frame is received in the first receiving space and faces the magnetic assembly.

5. The voice coil motor as claimed in claim 4, wherein at least two locating posts extend from the top surface, the cover is substantially a cuboid frame conforming to the stationary frame, the cover defines at least two first through holes corresponding to the locating posts, each locating post extends through the corresponding first through hole so that the cover is positioned on the top surface.

6. The voice coil motor as claimed in claim 5, wherein at least two positioning posts extend from the bottom surface, the base is substantially a cuboid frame conforming to the stationary frame, the base defines at least two second through holes corresponding to the two positioning posts, each positioning post extends through the corresponding second through hole so that the stationary frame is positioned on the base.

7. The voice coil motor as claimed in claim 6, further comprising a second elastic plate positioned between the base and the stationary frame, wherein the second elastic plate defines at least two fourth through holes spatially corresponding to the positioning posts, the positioning posts engage with the second through holes so that the second elastic plate is fixed to the bottom surface.

8. The voice coil motor as claimed in claim 5, further comprising a first elastic plate positioned between the cover and the stationary frame, wherein the first elastic plate defines at least two third through holes spatially corresponding to the locating posts, the locating posts engage with the third through holes so that the first elastic plate is fixed to the top surface.

9. The voice coil motor as claimed in claim 1, wherein the first recesses and the second recesses are grooves.

* * * * *